(12) United States Patent
Banerjee et al.

(10) Patent No.: US 10,074,052 B2
(45) Date of Patent: Sep. 11, 2018

(54) SYSTEM AND METHOD FOR SMART PUBLIC ALERTS AND NOTIFICATIONS

(71) Applicant: Tata Consultancy Services Limited, Mumbai (IN)

(72) Inventors: Snehasis Banerjee, West Bengal (IN); Debnath Mukherjee, West Bengal (IN); Prateep Misra, West Bengal (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 507 days.

(21) Appl. No.: 14/761,463

(22) PCT Filed: Dec. 5, 2013

(86) PCT No.: PCT/IN2013/000748
§ 371 (c)(1),
(2) Date: Jul. 16, 2015

(87) PCT Pub. No.: WO2014/111951
PCT Pub. Date: Jul. 24, 2014

(65) Prior Publication Data
US 2015/0363694 A1 Dec. 17, 2015

(30) Foreign Application Priority Data
Jan. 16, 2013 (IN) ............................ 148/MUM/2013

(51) Int. Cl.
*G06N 5/02* (2006.01)
*H04L 29/08* (2006.01)
(Continued)

(52) U.S. Cl.
CPC ............... *G06N 5/02* (2013.01); *G06F 9/542* (2013.01); *G06Q 30/02* (2013.01); *H04L 67/18* (2013.01); *H04L 67/306* (2013.01); *H04L 67/26* (2013.01)

(58) Field of Classification Search
CPC ........... G06N 5/02; G06F 9/542; G06F 3/048; G06F 3/0481; G06F 15/16; G06Q 30/02; H04L 67/18; H04L 67/306; H04L 67/26
(Continued)

(56) References Cited

U.S. PATENT DOCUMENTS 7,003,525 B1   2/2006 Horvitz et al.
7,084,775 B1   8/2006 Smith
(Continued)

FOREIGN PATENT DOCUMENTS

IN   2651/MUM/2011   9/2011
IN   1194/MUM/2012   4/2012
(Continued)

OTHER PUBLICATIONS

Hammar K., "Ontology Design Patterns in Use Lessons Learnt from an Ontology Engineering Case", Proceedings of the 3rd Workshop on Ontology Patterns, 2012.*

(Continued)

*Primary Examiner* — Dave Misir
(74) *Attorney, Agent, or Firm* — Ohlandt, Greeley, Ruggiero & Perle, LLP (57) ABSTRACT

Disclosed is a method and system for dynamically generating a customized, personalized and contextual alert for a user based upon personalized, contextual and background knowledge associated with the profile of the user. The system comprises a profile updater module configured to update the profile data of the user extracted either from the social web or from the user. Further, a reasoning module is configured to derive refined background knowledge in context with the updated profile data of the user. A monitoring module is configured to monitor the events sensed by a sensing module. A context extractor module is configured for extracting the context of the events and the context of the (Continued)

user. A knowledge converter module is configured to convert the extracted context into structured format. Finally, the refined background knowledge is steam reasoned to determine whether the events received are relevant to the user and accordingly transmitted.

16 Claims, 3 Drawing Sheets

(51) Int. Cl.
   *G06Q 30/02* (2012.01)
   *G06F 9/54* (2006.01)

(58) Field of Classification Search
   USPC .......................................................... 706/46
   See application file for complete search history.

(56) References Cited

U.S. PATENT DOCUMENTS

| | | | |
|---|---|---|---|
| 7,287,056 | B2 | 10/2007 | Loveland et al. |
| 7,411,493 | B2 | 8/2008 | Smith |
| 8,264,345 | B2 | 9/2012 | Baron, Sr. et al. |
| 8,311,513 | B1 | 11/2012 | Nasserbakht et al. |
| 2007/0005654 | A1 | 1/2007 | Schachar et al. |
| 2007/0216535 | A1* | 9/2007 | Carrino ............... G06F 17/3087 340/573.1 |
| 2012/0102050 | A1 | 4/2012 | Button et al. |
| 2012/0136865 | A1 | 5/2012 | Blom et al. |
| 2013/0290339 | A1* | 10/2013 | Luvogt ............. G06F 17/30867 707/740 |
| 2014/0052680 | A1* | 2/2014 | Nitz ........................ G06N 5/02 706/46 |
| 2014/0052681 | A1* | 2/2014 | Nitz ........................ H04L 51/02 706/46 |
| 2014/0140622 | A1 | 5/2014 | Chattopadhyay et al. |
| 2015/0086113 | A1 | 3/2015 | Chattopadhyay et al. |

FOREIGN PATENT DOCUMENTS

| | | |
|---|---|---|
| IN | 3308/MUM/2012 | 11/2012 |
| WO | 2013046218 A2 | 4/2013 |
| WO | 2013072925 A2 | 5/2013 |
| WO | 2013072926 A2 | 5/2013 |

OTHER PUBLICATIONS

Anicic D. et al., "Stream Reasoning and Complex Event Processing in ETALIS", 2010.*

Montanari M. et al., "Architecture for an Automatic Customized Warning System", IEEE, 2007.*

Boulos M. et al., "Crowdsourcing, citizen sensing and sensor web technologies for public and environmental health surveillance and crisis management: trends, OGC standards and application examples", International Journal of Health Geographics, 2011.*

Karl Hammar, "Ontology Design Patterns in Use", Jönköping University, Sweden, vol. 929, 2012, 12 pages, not supplied, retrieved.

Anicic et al. "Stream Reasoning and Complex Event Processing in ETALIS" FZI Research Center for Information Technology, Karlsruhe, Germany, 2009, 10 pages, not supplied, retrieved.

Montanari et al. "Architecture for an automatic customized warning system", Donald Bren School of Information and Computer Sciences, University of California, Irvine, IEEE conference on Intelligence and Security Informatics, 2007, pp. 32-39, not supplied, retrieved.

International Search Report dated Jan. 22, 2015 for corresponding PCT/IN2013/000748, 2 pages.

Hu et al. "Contextualized information assessment in smart cities" 1st Workshop on Intelligent Agents in Urban Simulation and Smart Cities, Montpelier, France, 2012, pp. 11-16.

* cited by examiner

SYSTEM AND METHOD FOR SMART PUBLIC ALERTS AND NOTIFICATIONS

TECHNICAL FIELD

The present subject matter described herein, in general, relates to smart public alert systems, and more particularly to smart public alert systems for generating real-time, personalized and contextual alerts.

BACKGROUND

With the rapid advancement of technology, citizens of modern cities are getting access to smart services such as mobile internet, GPS, telecommunication and transportation network that enhances citizenship experience, such cities are called smart cities. Public alerting system is one such important smart city service. A public alert system conveys alerts regarding various events such as traffic disruption, crime, hazard and emergency situations in a city to its citizens. Public Alert systems have been in existence for quite long. Earlier the alerts were conveyed through radio and TV, but now with the emergence of Internet and. Telecommunication email alerts, SMS and real-time posts on social platform have become the preferred medium of communication in the alert systems. But, to ensure that any city based incident is never missed, the alert system needs to sense every change in environmental conditions in the city. This is made possible as modern cities are gradually getting equipped with various types of sensors that can sense events as and when it happens.

Physical sensors like thermometer and hygrometer give readings based on which a concerned authority can raise weather alerts of high humidity and heat. The concerned authority can also raise alerts about traffic disruptions and criminal activities by analyzing live streaming from video surveillance equipment fitted at various locations in a city. Another interesting way to sense events is crowd sensing. In crowd sensing, the data is posted by citizens on social platform based on their personal observation or experience, this data form the basis of alerts. There are also other channels based on which alerts are forwarded by the concerned authority to the citizens. In some cities only emergency alerts like flood or high tide that affect a large population are forwarded. Some other modern cities in the world have facility to provide more specific subscription based alerts and information services to its citizens.

As the number of events occurring in the city is large, a citizen may be flooded with alerts that are irrelevant. Some city alert services provide a choice to the subscriber/user to state a set of location preferences on a web portal. However as the citizen's location in a city is dynamic, prior selection of preferred location leads to delivery of irrelevant alerts and some important alerts are missed out. For instance, if a subscriber (who is a citizen of New York) has stated that he stays in Columbus Avenue, but currently he is at Wall Street which is mid-way to office, so an alert about a traffic jam at Columbus Avenue is irrelevant to him at that moment. Similarly if a traffic incident happens in Fulton Street which is his next route segment on way, he will not be alerted as Fulton Street as a location of interest to the user is not stated in his preference.

Apart from events that will affect the citizen directly, a citizen may be interested in events that are affecting or will affect his/her colleagues. Hence, location based preferences are alone not good enough to filter alerts. As there are many events happening in a city frequently, it is difficult to notify the citizens about the relevant events that are currently affecting them or will affect them in future. Such a selective notification will enhance the citizen's ubiquitous experience.

One way to achieve such intelligent alerting system is to use the citizen's preferences, social web presence and demographic information to ensure that a citizen receives personalized alerts. Another way is to make the system context-aware such that the system will sense the current context of the user and send relevant alerts. Contextual information such as location of the citizen, time of day, weather conditions, and companion is considered in this approach. Another approach by Montanari et al that was presented as a research paper titled "Architecture for an automatic customized warning system. (2007), pp. 32-39" at IEEE conference on Intelligence and Security Informatics discloses architecture for a policy driven public warning system, wherein the alerts are disseminated based on some pre-set policies. The alert topics are represented as triples while the crisis policies are maintained as rules which are fired when corresponding conditions are met (like if an alert is severe, activate all mediums to convey the alert such as radio, TV and city alarms). Further, Hu et al in their research paper titled "Contextualized information assessment in smart cities" presented in 1st Workshop on Intelligent Agents in Urban Simulation and Smart Cities (2012), pp. 11-16 proposes a rule-based architecture for provision of information relevant to user's activities in a city. The architecture also introduces an ontology-based context model to characterize the possible situations of a citizen in a city. The concept of personalization and context-awareness can be further enhanced if the information gathered from these approaches can be extended. The extension of freshly gathered information into new information using existing knowledge is called as reasoning. Reasoning on streams, or stream reasoning, is an important mechanism to be used in such smart alerting systems. Note that information available from various sources is in general unstructured information. This unstructured information has to be converted into a structured format so as to facilitate reasoning.

Real-time streams of event and context need to be reasoned upon to derive richer knowledge. A stream reasoning system does reasoning on the fly on streams of knowledge combined with background knowledge to produce meaningful entailments. However the lifetime of the entailments is short-lived as the facts causing the entailment generation are themselves short-lived due to the dynamic nature of the real-time streams of knowledge. Adding to it, the stream reasoner works on a standard data structure such as triple or N-triple format. Considering the amount of information generated through social network, sensor network and changing contextual behavior of users, it is a time consuming process to convert this information into triple and N-triple format. Even if all the knowledge is converted into a standard structure as per the standard requirements of the stream reasoner, the stream reasoner requires a lot of time for loading and unloading this information to find out the relevant alerts associated with a particular citizen. Here the challenge with the stream reasoner is to process the structured knowledge at a faster speed and to enhance the overall performance of the system by reducing memory overhead, achieving scalability and generating efficient results.

Hence, there is a need in the art to address the problem discussed earlier by designing a near real-time system which can deliver personalized alerts based on citizen's preferences, demographics and information captured from the social web. There is a need to derive contextual information associated with the citizen and generate alerts depending on the citizen's current and future context. There is a need to reason the background knowledge, dynamically changing knowledge on the fly that aids the alerting system to decide whether to forward an alert to a particular citizen or not. There is a need to bring together context-awareness, personalization, near-real-time and knowledge-based aspects to the public alert domain to achieve the goal of providing a superior service to the citizens of smart cities. Further there is a need to filter the information collected from all these sources by means of prior-reasoning before applying stream reasoning to reduce the processing time required by the stream reasoner to derive the set of affected citizens.

SUMMARY

This summary is provided to introduce concepts related to systems and methods for dynamically generating a real-time, contextual and personalized notification alert for a user and the concepts are further described below in the detailed description. This summary is not intended to identify essential features of the claimed subject matter nor is it intended for use in determining or limiting the scope of the claimed subject matter.

In one implementation, a smart public alert system for dynamically generating a customized, real-time notification alert based upon the user's profile data and contextual data is disclosed. The smart public alert system comprises a processor and a memory coupled to the processor for executing a plurality of modules present in the memory. The plurality of modules comprises a profile database module, a background knowledge module, a sensing module, a monitoring module, a context extractor module, a context mapping database module, a knowledge converter module, a stream reasoning module and an application program module. The profile database module is configured to mine records associated with the profile information of the user from social web or can be retrieved from the electronic communication device carried by the user. The background knowledge module comprises a static or slowly changing knowledge about the city such as its locations and profile information of the citizens which is refined based on application of reasoning. The knowledge in the background knowledge module can be pre-processed, filtered and extended depending on the requirements of the registered continuous queries and the ad-hoc queries received from the users for receiving specific alerts. This helps in reducing the memory overhead of the system and focus on analyzing knowledge corresponding to the events in which the user is interested. The sensing module is configured for sensing raw event feeds in the system. The monitoring module is configured to monitor the sensed event feeds to determine raw event data and raw context data froth each event feed. The context extractor module is configured for extracting the context information from the raw context data, as-well-as the current context and future context of the user from the user interface unit of electronic communication device of the user. The context mapping database module is configured for providing the mapping information that assists the context extractor module to extract the context data from event feed and the user interface unit. The knowledge converter is configured for converting the raw context data and the raw event data into a structured knowledge format. The stream reasoning module is configured for continuously querying the refined structured background knowledge in order to determine if the sensed event data is relevant to the user by applying stream reasoning. The application program module is configured to monitor the results of query processing in the stream reasoning module, and accordingly transmit the relevant notification alert to the user interface unit of the electronic communication device of the user in desired format if the corresponding event data and the context data are relevant to the user profile data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for dynamically generating a customized notification alert by processing of user profile, contextual and personalized information are described. The notification alert is transmitted in a real-time to the user based on pre-processing of events that may affect the user by application of stream reasoning on the profile data, contextual data and the preference information of the user. The present subject matter discloses an effective and efficient mechanism for determining the preferences, current and future context, personalized details of the user expressed on various sources, such as social web, profile data stored on websites and a user interface unit of an electronic communication device itself. Background knowledge about the city is maintained that is extended, filtered or pre-processed using reasoning mechanism to retrieve only a few set of knowledge data-sets that is required for a specific application desired by the user. The extended, filtered and pre-processed knowledge in a structured form is then fed to a stream reasoning module that enables retrieval of list of alerts that needs to be sent to the user for dynamic events that occur in real-time in context with the user. The dynamic events in real-time are converted into a structured form and stream reasoned to determine if they are relevant to the user. In one example, a traffic alert is transmitted to the user, if the user has subscribed for the traffic alert. The background knowledge comprises static knowledge about the city roads and static slowly changing knowledge about the user profile. Further, if it is determined that the user is moving towards the road 'X' having traffic jam, it is inferred as user context which is steam reasoned to indicate that the alert needs to be transmitted to the user. In this example, the background knowledge about the specific road "X" is only utilized for stream reasoning that reduces the system overhead by concentrating analysis of background knowledge for dynamic event (traffic jam) occurring in the life of the user.

In order to generate such a customized alert, at first, the preferences and personalized information associated with the user is retrieved and maintained as personal user profile data. The personal profile data can be retrieved through the user interface unit of the electronic communication device, social web, and web portals etc. The profile data may also include user preferences such as the type of events in which they are interested. For example, a news reporter may be interested in criminal information rather than traffic jam alerts. Further, the profile data includes demographics and social information such as family, relatives, frequently performed activities etc.

Further, the context data associated about the user such as current location of the electronic communication device, and future context such as plan of travel in the upcoming days may be tracked and set as the user context data. This is required for generating the alerts relevant with the context of the user bypassing irrelevant alerts. In order to achieve this, GPS location of the electronic communication device is monitored periodically. Further, the current and future context information of the user can also be mined from the social web. The user profile data is extended to derive a background knowledge comprising static knowledge about the city and the slowly changing profile about the user. Further, the background knowledge can be extended, pre-processed and filtered to retrieve few background knowledge datasets that are sufficient to derive the list of alerts relevant for user-specified events in which he/she is interested. This helps in reducing the overhead of the stream reasoning mechanism.

The system enables gathering real-time event feeds in different formats from various sources. The event feeds, users' current and future context and the background knowledge datasets retrieved are fed to the stream reasoning module to determine if the specific event feed is relevant to the user. If the event feed is determined relevant, the alert is transmitted to the user interface unit of the electronic communication device carried by the user.

While aspects of described system and method for dynamic generation of a real-time, contextual and personalized alert of multimedia files based on the user's static and dynamic profile data, it may be implemented in any number of different computing systems, environments, and/or configurations, the embodiments are described in the context of the following exemplary system.

Figure 1:
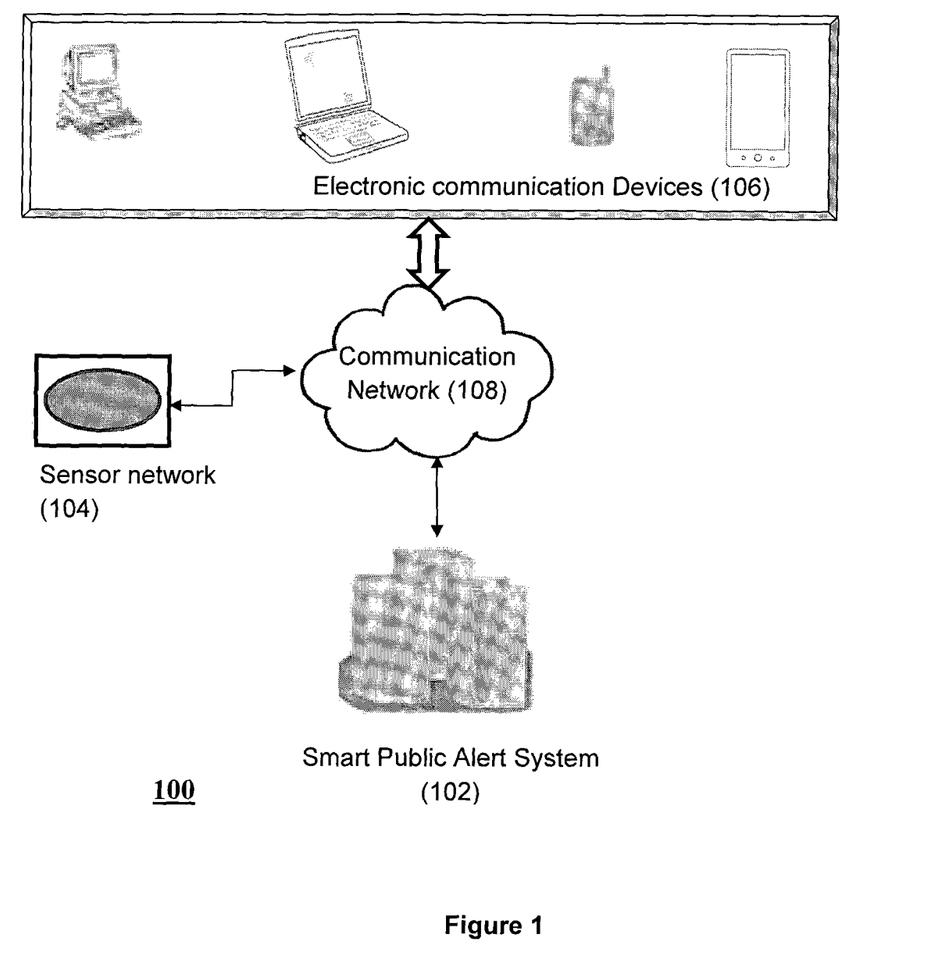
FIG. 1 illustrates a network implementation of a smart public alert system for dynamically generating a real-time, contextual and personalized alert in accordance with an embodiment of the present subject matter.

Referring now to FIG. 1, a network implementation 100 of a smart public alert system 102 for dynamically generating a customized notification alert is illustrated, in accordance with an embodiment of the present subject matter. In one embodiment, the smart public alert system 102 provides for dynamic, i.e. on the run creation and transmission of notification alerts based on the static/dynamic profile information associated with the user. In one embodiment, the smart public alert system 102 determines the profile information of the user based upon user's visits and posts on various social media, as-well-as other web portals and also based upon user's past behaviors. After determining the profile of the user, the smart public alert system 102 may extend the user profile data to generate a background knowledge associated with the user profile data which can be further pre-processed, filtered and extended on the basis of user-specified preference event types. The smart public alert system 102 is adapted to receive plurality of event feeds from the sensor network 104 or the electronic communication devices 106-1, 106-2 . . . 106-N, collectively referred to as the electronic communication devices 106. The context information (current and future context) of the user is received from the electronic communication device 106. Further, the context associated with each event is received from the event feed. The context information of the user, the context associated with each event and the pre-processed, filtered and extended background knowledge is converted in to structured format for stream reasoning. Based upon the analysis of stream reasoning, the smart public alert system 102 may generate a list of customized, personalized, contextual alerts suitable to the user. The customized alert list may keep on changing dynamically as and when the context, profile information, and the preferences in the event type of the user changes.

In an embodiment, the smart public alert system 102 can be hosted on Platform-as-a-Service (PAAS) platforms such as Real-Time Integrated Platform for Services and Analytics (RIPSAC), which has been disclosed in Patent Applications 2651/MUM/2011 and PCT/IN2012/000623 titled "A Computing Platform for Development and Deployment of Sensor Data Based Applications and Services". In such a scenario, the input to the application will be sensor data collected by the Sensor Observation Service in the RIPSAC, while the output can also be used by other applications hosted on the RIPSAC. Further, in another embodiment, the smart public alert system 102 can be implemented as an Intelligent Transport System (ITS) disclosed in. Patent Application PCT/IN2012/000624 titled "A Computing Platform For Development And Deployment Of Sensor-Driven Vehicle Telemetry Applications and Services" configured for transmitting the relevant contextual alerts to the users in the vehicles in transit.

Although the present subject matter is explained considering that the smart public alert system 102 is implemented on at least one of a variety of computing systems, such as a laptop computer; a desktop computer, a notebook, a workstation, a mainframe computer, a server, a network server, and the like. It will be understood that the public alert system 102 may be accessed by multiple users through the user devices 106. Examples of the electronic communication devices 106 may include, but are not limited to, a portable computer, a personal digital assistant, a handheld device, and a workstation. The electronic communication devices 106 are communicatively coupled to the smart public alert system 102 through a network 108.

In one implementation, the network 108 may be a wireless network, a wired network or a combination thereof. The network 108 can be implemented as one of the different types of networks, such as intranet, local area network (LAN), wide area network (WAN), the internet, and the like. The network 108 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 108 may include a variety of network devices, including routers, bridges, servers, computing devices, storage devices, and the like. The working of the smart public alert system 102 along with other system components of system 100 can be explained in detail in FIGS. 2 and 3 explained below.

Figure 2:
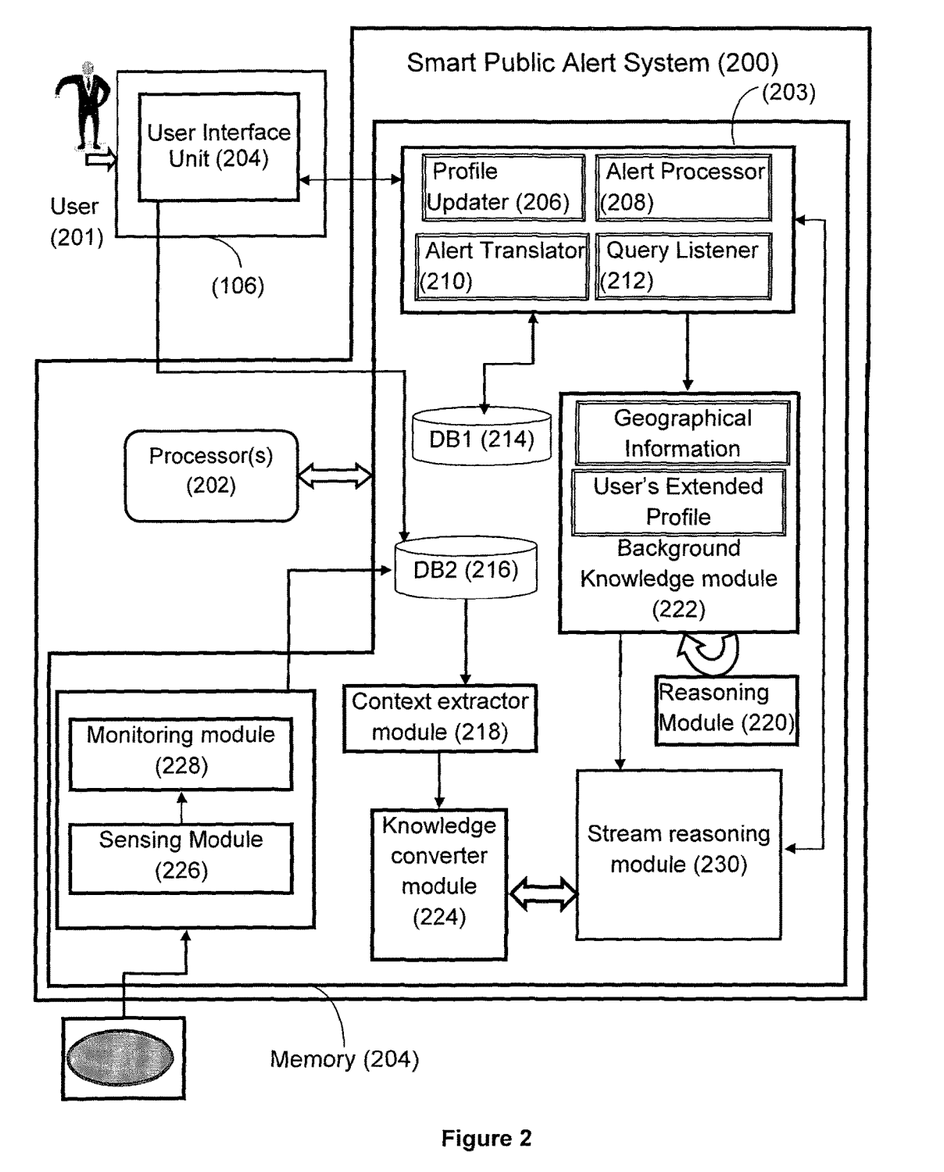
FIG. 2 illustrates a system architecture diagram of a smart public alert system for dynamically generating a real-time, contextual and personalized alert in accordance with an embodiment of the present subject matter.

Referring to FIG. 2, a detailed working of the smart public alert system 102, referred as 200 along with other system components of the system 100 is illustrated, in accordance with an embodiment of the present subject matter. In one implementation, in order to receive contextual, personalized and customized notifications alerts, a user 201 has to register his/her profile data and indicate the social presence on the web. The smart public alert system 200 may include at least one processor 202, an input/output (I/O) interface (not shown), and a memory 204. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory. The I/O interface may include a variety of software and hardware interfaces, for example, a web interface, a graphical user interface, and the like. The I/O interface may allow the smart public alert system 200 to interact with the user through a user interface unit 204 of the electronic communication device 106. Further, the I/O interface may enable the smart public alert system 200 to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include different modules. The modules include routines, programs, objects, components, and data structures etc., which perform particular tasks or implement particular abstract data types that supplement applications and functions of the smart public alert system 200.

In one implementation, at first, a user may use the user interface unit 204 of the electronic communication device 106 to access the smart public alert system 200 via the I/O interface. The user may register, using the I/O interface in order to use the smart public alert system 200.

The user 201 is adapted to subscribe to a service that will provide relevant public alerts to him/her specific to an event. That is, the profile data may also include a list of event types for which the user 201 may require alert. Further, the user 201 may specify the format and preferred language in which the alert should be delivered.

The profile data is mined automatically through a profile database 214 or can be retrieved from the user 201. The profile database 214 represents the social web data that can be extracted using social web mining techniques known in the art. Examples of social web may include social networking websites, feedback/review collection websites, and blogs. A profile updater module 206 in an application program module 203 of the smart public alert system (200) is adapted to extract the relevant data from the profile database 214. The user 201 can manually submit the profile data through the user interface unit 204 of the electronic communication device 106 with the smart public alert system 200. The profile data includes information such as age, gender, places of interest, habits, profession, relatives and common activities the user may involve in. Further, the profile data can also be retrieved based on a model learnt over time based on the user's behavior and activity using machine learning techniques. Further, the profile data may include information such as user-specific event for which alert types is the citizen interested in (ex. a news reporter may be interested in crimes rather than traffic jams), demographics and social information like family and (close) relatives. This will also include the citizen's activity in the city, like locations often visited etc.

In one implementation, further, in order to receive the relevant information, apart from the profile information, contextual information of the user 201 is desired. In an embodiment, context information relevant to the user 201 may include information such as time of a day, companion, current activities and environmental conditions etc. In one embodiment, the context information associated with the user 201 can be sensed through various sensing devices in the sensor network 104 by the sensing module 226. For example, in an exemplary embodiment, the location of the user 201 can be sensed by the GPS device installed either in the electronic communication device 202 or any dedicated GPS device installed in the sensor network 104. Further, such GPS information can be manually posted by the user 201 through at least one GPS application being executed on the user interface unit 204 of the electronic communication device 106.

In one implementation, the context information of the user 201 can further be retrieved by learning the contextual behavior derived from the personal calendar maintained by the user 201. For example, an event about the user's visit to church each Sunday stored in the calendar can be learnt as the user's contextual behavior. This enables retrieval of frequently visited locations along with that particular time and day of the visit. Further, in another implementation, in case of location context, from the current location path followed by user, future paths can be predicted. For example, if the user 201 follows path a,b,c under Context 'X' and in learned database, user has followed paths a,b,c,d, e under context X, then the system can add paths d and e to probable future location. Further, in an embodiment, the contextual behavior can be retrieved from the user manual input, wherein the user 201 might indicate his/her journey details (start point, end point, will be at location X at time T). The contextual information about the user 201 can also be derived from the tour guide requested by the user 201 if the user is planning to tour in future. For example, the user 201 may specify his/her interest in receipt of alert about the tour guide for the planned tour. From this request, the current and future context of the user 201 can be derived. Similarly, the user 201 may specify the meeting acquaintances for a specific duration and may subscribe to receive alert about the meeting location and time. In an embodiment, such contextual information (current and future) is extracted from these sources using a context extractor module 218.

In an embodiment, the sensing module 226 is further configured for sensing environmental conditions in a city along with other event notification feeds received from various sources. Each notification feed is in the form of raw event data and raw context data. The event notification feed can be received from various sources comprising private and public agencies, and social web posts etc. The events in the social web are sensed by keeping real-time track of human generated content in the social community networks. In an embodiment, the event notification feeds can also be retrieved by analyzing the news text scrolled on a television news channel or an audio received from the radio sets. The News on TV and radio can form major source of information, and relevant information can be extracted from them by OCR or Speech-To-Text techniques on real-time. The subject matter of retrieving relevant information from the TV news has been disclosed in the patent applications 1194/MUM/2012, PCT/IN2012/000423 and 3308/MUM/2012 respectively.

In an embodiment, a monitoring module 228 is configured for monitoring of the sensed data such as social web posts, television or radio news and agency alert feeds etc received from heterogeneous sources and to differentiate the raw event data and the raw context data for each feed. Further, the monitoring module 228 is adapted to do a duplicate check by keeping the track on most recently updated data that has been processed.

In an embodiment, the raw event data and the raw context data is then converted into a structured knowledge format that is feasible for analysis conducted by a stream reasoning module 230 using a knowledge converter module 224. Any reasoning system needs data in a standard form with compatible syntax format that can be understood by the stream reasoner. However, as the data retrieved from varied sources is in unstructured, semi-structured or heterogeneous structured format; so a mechanism is needed to bring this together in a standard uniform form suitable for reasoning purpose. Triple or n-triple suits this form (ex. Resource Description Framework (RDF) (source: http://www.w3.org/RDF/) or Web Ontology Language (OWL)) (source: http://www.w3.org/TR/owl-features/).

In an exemplary embodiment, the raw event data can be converted in to structured format such as the RDF or OWL which is a standard way to represent a triple T. For structured data that follow some open standards like Common Alerting Protocol (CAP), an OASIS Standard (http://docs.oasis-open.org/emergency/cap/v1.2/CAP-v1.2-os.html), the conversion to knowledge is easy. For semi-structured data, this can be done by relevant keyword based match. As a simple example, for semi-structured data like "Robbery on Street X at 10 pm" can be converted based on keyword and pattern-based match to structured form (like RDF): (here e: is a namespace like "http://www.tcs.com/events#"
<e:eventid1><e:isOfType><e:Robbery>
<e:eventid1><e:locatedAt><p:Street X>
<e:eventid1><e:occuredAtTime><10 pm>

The keywords can be manually tagged or learned over time by analyzing past data. For unstructured data, some training is done at first by tagging what the text conveys. Models can be learnt by applying machine learning to classify the texts. One way to understand the unstructured data is to use natural language processing and information extraction techniques. For example, in case of unstructured data like real-time blogs (ex. Social web posts) classification needs to be done. Initially, through training on past manually tagged dataset, the system is adapted to learn what keywords (or group) represents the type of event. Then on new data, classification technique will be applied. Knowledge-pattern based sentence conversion to knowledge is another way. The converted data into structured format is loaded on the stream reasoning module 230 for further processing.

In an embodiment, the context extractor module 218 collects current context from the user's device (like GPS) and the monitoring module 228. Mapping relationship of the sensed raw context data is stored in a context mapping database 216. For example, raw GPS locations are mapped to some landmark locations, raw time is mapped to someday part and temperature is mapped to hotness or coldness. The future contexts like planned route of a user or weather forecasts are also gathered. The context mapping database 216 therefore acts a context repository for the context extractor module 218 to extract the context of each notification feed. The context data extracted is then converted into the structured format before being forwarded to the stream reasoning module 230.

In an embodiment, a background knowledge module 222 is maintained in the form of knowledge repository that can assist in determining the contextual, personalized and customized alert to the user 201. The background knowledge is composed of static knowledge such as geographical location and slowly changing knowledge like user preferences (user's extended profiles). The knowledge about the city like streets, points of interest and its nearby locations along with static data about users is stored in the background knowledge module 222. For the stream reasoning module 230 to function, the knowledge has to be in a format that the reasoning module 230 understands. This format can be the RDF format which is a standard representation of triples <subject, predicate, object> for the semantic web. An example of a triple: <Joy><likes><Cricket>. Another example is: <Joy><hates><Candy>.

The stream reasoning module 230 is configured for reasoning at a faster speed. Rules are applied on the background knowledge stored in the background knowledge module 222 to extend the knowledge in context with the specific event type requirements. This enables loading only that portion of the knowledge that is needed for a particular application/event type. In certain scenario, the base background knowledge will not be loaded but the derived knowledge will be. For example the information that two locations lies in same neighborhood infer that they are mutually near each other. An application may only need the knowledge about nearness of those two locations, not their neighborhood names. This takes load off from the stream reasoning module 230 that can utilize the extended background knowledge on processing the real-time knowledge streams of context and events received.

In order to load selective knowledge on the stream reasoning module 230 and to achieve good performance, pre-processing and filtering of the background knowledge becomes significant. This is achieved by deriving new knowledge (extended knowledge) by applying rules. Further, filtering of the knowledge is achieved by keeping only the datasets that are needed by the stream reasoning module 230 for processing of the current queries/rules registered by the user. Additionally, the background knowledge can be pre-processed to derive the domain-dependent knowledge by applying rules. Further, an on-demand loading/unloading of knowledge can be implemented according to the processing requirements of the stream reasoning module 230 for new queries/rules registered in the system.

Stream reasoning module 230 is adapted to execute continuous queries and reasoning on the extended background knowledge to accomplish its task. An application program module 203 in the smart public alert system 200 is configured for registering rules and queries with the smart public alert system 200 for retrieval of alerts in context with the application requirements of the user 201. The electronic communication device 106 communicates with the application program module 203 to retrieve alerts and also to update the profile data of the user 201. The application program module 203 is adapted to listen on the registered continuous queries over the combined knowledge to fetch results, if any. Basically the whole logic of reasoning can be embedded in a SPARQL query. For example if the following SPARQL query:
select ? location2 where
{? person s:isLocatedAt ? location1.
? location2 s:isNear ? location1} is run on a knowledge store of geographical information, it will return places located near the person's current location. The logic to get the locations near a person's current location can be written in the form of rules as:(The system proposed utilize Apache Jena Rules syntax (source: http://jena.apache.org/) to represent the rules and SPARQL syntax (http://www.w3.org/TR/rdf-sparql-query/) to represent the queries. However the stream reasoner may follow any other alternative and equivalent rule and query format)
? person s:isLocatedAt ? location1).
(? location2 s:isNear ? location1)
! (? person s:isNear ? location2)

Next a one line query will serve the purpose:
select ? location where {? person s:isNear ? location}

In the above case, the query is just for data retrieval, no logic is embodied within it. This approach to get results by querying on inferred knowledge is referred as rule-based approach. The prime purpose of the stream reasoning module 230 is to reason as quickly as possible. After initial loading of the background knowledge in the memory of the stream reasoning module 230, the main time consumption is divided among the following steps: a) adding new knowledge b) deleting obsolete knowledge c) firing rules to produce entailment d) querying the combined knowledge. Both addition and deletion of knowledge triggers rule firing. Deletion is an expensive operation because along with the obsolete facts, the obsolete entailed knowledge needs to be deleted.

Thus, the continuous queries/rules received from the application program module enable real-time filtration and extension of the background knowledge. The filtered, extended knowledge datasets, and the knowledge streams received from the event notification feeds and the context extractor module 218, collectively referred as combined knowledge is then reasoned by the stream reasoning module 230 to determine if the alert is relevant to the user 201. The filtered, pre-processed and extended background knowledge helps in reducing the overhead of the stream reasoning. This pre-processing, extending and filtering of background knowledge is explained by way of few examples as below:

In one implementation, Let the query Q to be run on the combined knowledge (background and dynamic) in stream reasoner be: select ? event ? person where {? event p:affects ? person}. This query will return the pair <event1>, <person1> if the combined knowledge contains the graph pattern (called G1):-<e:event1><p:affects><p:person1>

G1 is derived based on some rules fired on the combined knowledge. One rule that may be reason for this match may be:
(? person p:hasDisease ? disease).
(? event e:hasAdverseEffectOn ? disease)->
(? event e:affects ? person)

For example, the user has stated medical record as: (<p:person1><p:hasDisease><d:Heat_disease>)
Event data is (<e:event1><e:hasAdverseEffectOn><d:Heat_disease>).
So the above two facts infer the fact (<e:event1><p:affects><p:person1>)

I) Extending Knowledge:
Consider following rule is registered in the system:
(? person p:hasPreference ? alertType).
(? event e:isOftype ? alertType)->
(? event e:affects ? person)

Incoming event triple is (<e:event1><e:isOfType><a:Robbery>) which is about robbery alert.
Person has specified in preferences that: <p:person1><p:hasPreference><a:Crime>

So a rule will be applied beforehand on background knowledge:
(? person p:hasPreference ? alertClass)
(? alertType a:isOfClass ? alertClass)->
(? person p:hasPreference ? alertType)

So if it is known that: (<p:person1><p:hasPreference><a:Crime>) and it is also known that (<a:Robbery><a:isOfClass><a:Crime>) then the entailment on applying the rule is (<p:person1><p:hasPreference><a:Robbery>)

This will enable the match if the event triple is either: (<e:event1><e:isOfType><a:Robbery> or (<e:event1><e:isOfType><a:Crime>

II) Filtered Knowledge:
Consider following rule is registered in the system
(? user s:hasInterest ? location).
(? event s:hasLocation ? location)->
(? event e:affects ? user)

In the background knowledge, there is knowledge of form:
(? user s:hasInterest ? location)—graph pattern form 1 (G1)
(? user s:hasRelative ? relative)—graph pattern form 2 (G2)

Here G2 is of no use as this is unutilized by the system, i.e. suppose there are no rules registered in the system to use the facts of form G2.

When loading the background knowledge, the system will search for patterns that exist in the query and rule. In this case the patterns that the system searches (and if found loads the same):
(? user s:hasInterest ? location)-> required for Left-hand-side matching in rule
(? event e:affects ? user)-> may be present in background knowledge in other examples Another example is the following where zip code and neighborhood information is not loaded:
Rule 1:
(? location1 s:hasZip ? zip).
(? location2 s:hasZip ? zip)->
(? location1 s:isNear ? location2)
Rule 2:
(? location1 s:hasNeighborhood ? neighborhood).
(? location2 s:hasNeighborhood ? neighborhood)->
(? location1 s:isNear ? location2)
Rule 3:
(? user s:isNear ? location).
(? event s:hasLocation ? location)->
(? event e:affects ? user)

Note that rule 3 is registered in stream reasoner, while rules 1 and 2 are used to infer the data to be loaded beforehand.

III) Pre-Processing Knowledge:
In certain cases, the application does not care about a specific concept, and then the system can capitalize on this to enhance the performance.
Rule 1
(? location1 s:isNear ? location2)->
(? location1 s:isNearOrOn ? location2)
Rule 2:
(? location1 s:isOn ? location2)->
(? location1 s:isNearOrOn ? location2)
Rule 3:
(? user s:is NearOrOn ? location1).(? event s : hasLocation ? location2)
(? location1 s:is NearOrOn ? location2)->
(? event e:affects ? user)

Note that rule 3 is registered in stream reasoner, while rules 1 and 2 are used to infer the data to be loaded beforehand.

Here only the 'nearOrOn' graph patterns is loaded. This is useful if the query logic doesn't need specifically 'near' and 'on', but is happy with any. The execution of rules/query is fast due to reduced no of graph pattern matches needed in the rule firing stage.

IV) On Demand Loading/Unloading:

In this example, say the focus is on the user profile portion of the background knowledge, and there is knowledge of form:

(? user s:hasInterest ? location)—graph pattern form 1 (G1)
(? user s:hasRelative ? relative)—graph pattern form 2 (G2)
   The current rule is that of:
(? user s:hasInterest ? location).
(? event s:hasLocation ? location)->
(? event e: affects ? user)
   So facts with pattern G1 is loaded.
   Now if a new rule is added say
(? user s:hasRelative ? relative).
(? event e:affects ? relative)->
(? event e:affects ? user)
   Then the knowledge matching G2 pattern will be loaded.
   Now if above "relative" rule is deleted, then the corresponding non-essential graph patterns (here G2) will be deleted from the stream reasoner memory. Also if there are any entailments as a result of the old rule, those will get nullified on rule deletion.

In an embodiment, the application program module 203 is configured for transmitting the results of the stream reasoning to the user interface unit 204 of the electronic communication device 202 of the user 201. This also forms as a medium by which the profile data is stored and updated in the background knowledge module. The application program module 203 comprises a Query Listener module 212 that is adapted to listen for the query results accepted from the stream reasoning module 230. An Alert Processor module 208 in the application program module 203 processes the results and sends the alerts to the intended users. In between, an Alert Translator module 210 in the application program module 203 translates the alerts to the language of the specific user's choice and formats the alerts customized to user's intended user interface unit 204 and medium of communication.

In an embodiment, the alerts generated can be transmitted to other devices within the vicinity of the smart public alert system. For example, in one implementation, a digital signage board or a kiosk can be configured for displaying the alerts about events affecting the mass audience around a particular location in which the digital signage board or the kiosk is located. For instance, if there is a shooting of a film at street 'X', immediately all signage and kiosks located with the proximity of the shooting event shall be displayed with the details about the shooting event.

In an embodiment, the alerts generated can be transmitted in the form of live video, audio, multimedia or images and combinations thereof. For example, if there is a traffic jam at street 'X' and, there is a CCTV camera installed at the street 'X', then the image of live video feed of the traffic jam can be transmitted to the user heading towards the street 'X'. In a multi-lingual scenario, due to lack of character decoding support, standard lightweight image formats can be used to send alerts in MMS or web application formats.

In an embodiment, the alert generated for a specific user can also be transmitted to few other users in close relationship with the users who may also be affected by certain event for which the alert is generated. That is, in one implementation, the smart public alert system 200 can alert similar users or related users based on mutually affecting event. For example, a close relative of a user may be interested in severe alerts about the user. In another case of a meeting, users attending a meeting will be interested in traffic disruption alerts of each other. Further, in another case, wherein quiz event is being scheduled in the city requiring two participants for a team, then, if two users who are fascinated about quizzing and are acquainted with each other are passing close to the event, they both will be alerted about the quiz event.

In an embodiment, the traffic alerts generated using the smart public alert system 200 can be utilized for controlling the traffic signals installed on the roads of the city. For example, if an accident is detected at street 'X', the alert can be generated about the accident at the street 'X', which can be transmitted to the traffic lights in the zone of the street 'X', which on receipt of the alert is intelligently adapted to turn red. This will help in managing the traffic in the zone, wherein accident takes place.

In an embodiment, the smart public alert system 200 can be configured for receiving ad-hoc queries from the user 201 about receipt of alerts for events not previously registered in the system. In such scenario, the smart public alert system 200 implements a real-time query mechanism that enables generation of alert about the events specific to ad-hoc queries. For example, the user 201 may instantaneously request for receipt of alert about an event such as "mega sale at street X". The system 200 accommodates the ad-hoc querying based on specific query forms and accordingly generate the alert to be transmitted to the user in a near real-time.

In an embodiment, the smart public alert system 200 is configured for receiving feedback from the user 201 about the relevancy of alerts received by the user 201. For example, when the user 201 receives a specific alert, the system 200 prompts the user 201 to provide feedback whether the alert received was relevant for him/her. This feedback mechanism enables the system 200 to adaptively learn the failure of execution and accordingly improvise in the future. In case, if the user 201 marks certain alert as irrelevant, the system 200 will stop transmitting those alerts in future. One way of implementing this is to lower the contextual learned behavior data's probability score, in case of negative feedback. On the contrary, on positive feedback the probability score of the contextual learned behavior data will be increased.

Figure 3:
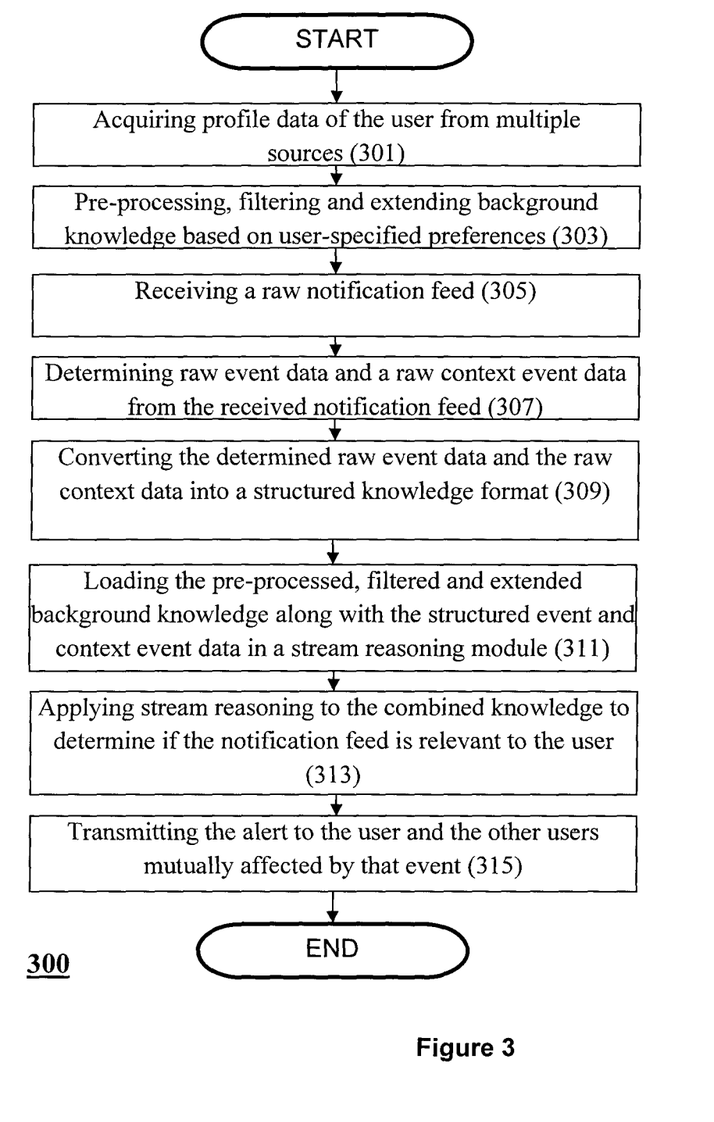
FIG. 3 illustrates a method for dynamically generating a real-time, contextual and personalized alert based upon user's profile data and contextual data, in accordance with an embodiment of the present subject matter.

Referring now to FIG. 3, a method 300 for dynamically generating a customized, personalized and contextual alert based on personalized and contextual information of the user is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described smart public alert system 102.

At block 301, the profile data associated with the user comprising list of event types subscribed for receiving alerts, demographic profile and contextual information (current and future context) is acquired from multiple resources including the profile database 214, the user interface unit 204 and the GPS location of the electronic communication device 202.

At block 303, reasoning is applied on background knowledge repository 222 storing geographical information and the profile information related to multiple users to pre-process, filter and to extend the background knowledge in context with the user-specific preference events determined through the profile data associated with the user.

At block 305, at least one raw event notification feed is received from one or multiple heterogeneous sources.

At block 307, raw event data and raw context data is determined from the received raw event notification feed.

At block 309, the raw event data and the raw context data is converted into a structured knowledge format.

At block 311, the pre-processed, filtered and extended background knowledge along with the converted event data and the context data collectively referred as combined structured knowledge is then loaded in the stream reasoning module 230.

At block 313, the loaded combined knowledge is stream reasoned to determine if the event data and the context data associated with the event notification feed is relevant with the current and future context of the user. Further, the stream reasoning enables retrieval of list of users that may be affected with the same event.

At block 315, the alert is generated as a result of the stream reasoning which is transmitted to the user and the list of users retrieved.

BEST ENABLED MODE

In an exemplary embodiment, the smart public alert system was utilized as suitable solution for deployment in a particular smart city.

The main technical challenges in the knowledge gathering process were as follows:
a) Gathering accurate data (both city and user profile data)
b) Conversion of data into knowledge (ex. unstructured RSS or Twitter posts to RDF)
c) Maintaining a service to receive real time data from alerts and user's context The background knowledge consists of data about the city and its citizens. The smart city data includes street names, zip codes, and neighborhoods. Apart from geographical data, the data about the city inhabitants also formed the background knowledge. Though, there is an option to enter individual data in the proposed smart public alert system web portal, however readily available citizen data was not found. So for experiments, this data was simulated. The geographic and citizen data was converted to RDF format and then reasoning was applied to extend the knowledge using some of the relevant rules as discussed. The main context of the citizen was location which was tracked by their GPS location. So the context data came in the form of latitude, longitude positions and the same was converted into a location (as it is impractical to store knowledge about decimal valued latitude and longitude pairs). This was achieved by storing geographic data in a spatial database like PostGIS (source: http://postgis.refractions.net/), where an incoming GPS stream was converted into a location based on the nearest (latitude, longitude) match found in the database. For experimental purposes, the context data was also simulated. However there is facility in the system to accommodate real streaming context and static profile data of the citizens.

Among the real-time event sources available in the smart city, following were the ones used for experiments:
a) RSS crime feeds)
b) General alerts about crime, weather, and traffic disruption. The data was in semi-structured RSS form)

The above feeds were then needed to be converted to RDF triples after text processing and were fed to the system. This was achieved by gathering feeds to build a corpus to learn relevant keywords and then finding whether an incoming stream contains those keywords and thereby inferring the feed contents. The main target was to get a list of citizens and the corresponding events that have affected them. If the entailments contain such a pattern then the following query will suffice:
Select ? event ? person where
{? person p:isAffectedBy ? event}
Desired example output to the above query will be of form:
'John Wayne', 'Traffic Disruption at X street'
Some of the atomic concepts that will eventually entail knowledge patterns to support the above query are:
Concept: User's Preference for Alerts based on Event Type
Rule:(? user p:hasPref ? eventType).
(? eventTypeSub p:subClassOf ? eventType)->(? user p:hasPref ? eventTypeSub)
Example: If a user has preference for Traffic Disruption event, he has preference for all of its subclasses like shooting, accident, road blockage, traffic jam, etc.
Concept: Nearness of a place
Rule 1: (? location1 s:hasZip ? zip).
(? location2 s:hasZip ? zip)->
(? location1 s:isNear ? location2)
Rule 2: (? location1 s:hasNeighborhood ? neighborhood).
(? location1 s:hasNeighborhood ? neighborhood)->
(? location1 s:isNear ? location2)
Example: If two locations share the same zip (or postal code) or neighborhood they are near to each other.
Concept: An event affecting a user based on location
Rule: (? user s:isAt ? location).
(? event s:hasLocation ? location)->
(? event e:affects ? user)
Example: If a user is at location A and there is shooting going at A, he will get affected. However, the user may be interested only in certain types of events like traffic disruption; therefore such situations can be handled by adding a 'User has interest in certain event types' condition to the LHS (antecedent) of the above rule as shown below:
(? user s:isAt ? location).
(? event s:hasLocation ? location).
(? user p:hasPref ? eventType).
(? event e:ofType ? eventType)->
(? event e:affects ? user)
Concept: An event affecting a user based on profile
Rule: (? user p:hasDisease ? disease).
(? event p:hasAdverseEffectOn ? disease)->
(? event e:affects ? user)
Example: If a user has heat related disease, a hyperthermia alert will affect the user.

Concept: An event affecting a user's relatives
Rule: (? user1 p:hasRelation ? user2).
(? event e:affects ? user2)
->(? event e:affects ? user1)

Example: If a child is affected by an event so is his father. The condition 'User has interest in certain event types' can also be added to the above rule in the way discussed earlier. However there is a problem in the last rule, because the rule is transitive. The rule entailment should be restricted to one level. Otherwise there is high chance that generated entailments will falsely say that every person will get affected by any event. This assumption is based on the theory of six degrees of separation where it has been shown that the average distance between two nodes (persons) in the social graph (graph connecting persons based on acquaintance) is usually less than six. So the last rule is redefined with a different property 'indirectlyAffects':

Concept: An event indirectly affecting a user
Rule: (? user1 p:hasRelation ? user2).
(? event e:affects ? user2)->
(? event e:indirectlyAffects ? user1)

The initial query has to undergo a change to accommodate the above rule: select ? event ? person where {
{? event e:affects ? person} UNION
{? event e:indirectlyAffects ? person}}

Another way is break this into two separate queries. As the final goal is to search for graph patterns <e:indirectlyAffects> and <e:affects>, the search space can be restricted to entailments only.

In this exemplary embodiment, the user interface unit was a web page that needs signing up for the service. The user had to enter his/her profile and social details. The user was prompted to select his places of interest in the smart city. There was also facility to fetch the personal details using Social Network API. The user had an option to set preferences for alert like type and time of alert. The user was enabled to update this information any time. If the user was about to travel, he was enabled to enter his travel route in the system, to get predictions alerts based on his future location. The user's mobile device had an app to post GPS locations to the Context Extractor service. System was adapted to monitors alerts from the sources discussed earlier. When a relevant alert was found by the Alert Processor, the same was forwarded to the user in user's preferred language. The reason why the alert was send can also be viewed by the user.

Although implementations for methods and systems for dynamically generating a customized, personalized and contextual alerts based upon user's personalized and contextual information specific to structural features and/or methods, it is to be understood that the appended claims are not necessarily limited to the specific features or methods described. Rather, the specific features and methods are disclosed as examples of implementations for dynamically generating a customized notification alert to the user.

We claim:

1. A method for transmitting at least one real-time customized notification alert to an electronic communication device of at least one user characterized by enabling a software-based platform to process a profile data and a contextual data associated with the at least one user to generate the customized notification, the method comprising computer-implemented steps of:

acquiring the profile data for the user, wherein the profile data comprises user specific contextual information, demographic profile and a list of event types for which a notification alert in a specific format is desired;

pre-processing, filtering, extending and on-demand loading or unloading structured background knowledge comprising geographical information and changing information about a plurality of users in order to derive a refined structured background knowledge relevant to the profile data for the at least one user using a set of one or more rules or one or more queries registered through an application program module communicatively coupled to the electronic communication device;

receiving at least one raw event feed from one or more heterogeneous sources in assorted data formats, wherein the heterogeneous sources are a part of sensor network communicating with the electronic communication device though a communication network;

determining a raw event data and a raw context data from the received raw event feed by using a context mapping database storing the user specific contextual information, wherein the received raw event feed is of at least one data format selected from a group comprising of text, image, video, audio, multimedia and combinations thereof, and wherein the raw event data is selected from a group comprising of traffic jams, robbery, flood, climate updates, traffic accident, road blockage, criminal activity, mutually affecting event among multiple users and combinations thereof;

converting the raw event data and the raw context data into a structured knowledge format;

loading a combined structured knowledge comprising the refined structured background knowledge, the structured raw event data and the structured raw context data into a stream reasoning module;

applying stream reasoning by querying the combined structured knowledge to determine if the received raw event feed is relevant to the acquired profile data and the user-specific contextual information for the user; and transmitting the notification alert on the electronic communication device of the user in the specified format if the received raw event feed is identified as relevant by the applied stream reasoning.

2. The method of claim 1, wherein the user-specific contextual information includes current and future context data about the user which is either retrieved through a social web using mining technique or is manually inputted by the user through the electronic communication device or is tracked through a GPS device in the electronic communication device.

3. The method of claim 1, wherein the demographic profile is automatically mined through a social web or is manually inputted by the user through the electronic communication device, and wherein the demographic profile includes name, age, sex, location, religion, family details, job profile, places of interests, relatives or combinations thereof.

4. The method of claim 1, wherein the geographical information comprises the knowledge about a particular location such as a city, streets in the city, points of interest in the city, nearby locations to the city and combinations thereof, and wherein the changing information comprises dynamic variance in preference information of the user and the user profile data.

5. The method of claim 1, wherein the pre-processing step comprises identifying domain-dependent knowledge from the background knowledge corresponding to data needed for generating relevant alerts for the user.

6. The method of claim 1, wherein the filtering step comprises selecting at least one knowledge dataset from the background knowledge that is relevant to data needed for generating relevant alerts for the user.

7. The method of claim 1, wherein the extending step comprises identifying at least one new knowledge dataset that is relevant to data needed for generating relevant alerts for the user and not present in the background knowledge.

8. The method of claim 1, wherein the on-demand loading step comprises loading of ad-hoc knowledge required by the stream reasoning for processing of the background knowledge in context with data needed for generating relevant alerts for the user, and wherein the on-demand unloading step comprises unloading of knowledge required by the stream reasoning from the background knowledge that is irrelevant to application needed data for generating relevant alerts for the user.

9. The method of claim 1, wherein the one or more heterogeneous sources are selected from a group comprising physical sensors, soft sensors, social web, Personal calendar, Historical behavior Pattern, Social media updates, RSS feeds, news agencies, dynamically changing contextual information such as GPS location and combinations thereof.

10. The method of claim 1, wherein the raw context data comprises information related to said raw event data selected from a group comprising time, location, current and future activity, environmental conditions and combinations thereof.

11. The method of claim 1, wherein the raw event data and the raw context data are converted into the structured knowledge format using keyword pattern matching, information extraction techniques, Natural-Language Processing (NLP) algorithms and combinations thereof, and wherein the structured knowledge format is one of a Triple, n-triple, Resource Description Framework (RDF), Web Ontology Language (OWL) and combinations thereof.

12. The method of claim 1, wherein the electronic communication device is capable of displaying customized alert into at least one data format selected from a group comprising a text data, an audio data, a video data, an image data, a multimedia data, live multimedia streaming and combinations thereof.

13. A system for transmitting at least one real-time customized notification alert to at least one user, the system comprising:
at least one electronic communication device;
a sensor network comprising one or more sensor devices;
a smart public alert system communicatively coupled with the at least one electronic communication device and the sensor network through a communication network;
the at least one electronic communication device further comprising a user interface unit configured for retrieving relevant alerts and updating the user profile data;
the smart public alert system further comprising:
at least one processor electronically coupled with a memory, the memory comprising a plurality of modules executed by the at least one processor, the modules comprising:
a profile database storing profile data related to plurality of users, wherein the profile data comprises user specific contextual information, demographic profile and a list of event types for which a notification alert in a specific format is desired;
a reasoning module configured for reasoning a background knowledge module to pre-process, filter and extend a background knowledge stored in the background knowledge module to derive a refined structured background knowledge;
a sensing module configured to sense at least one raw event feed from the at least one sensor device in the sensor network or the at least one electronic communication device;
a monitoring module adapted to monitor the raw event feed sensed and to determine a raw event data and a raw context data from the received raw event feed, wherein the raw event feed is of at least one data format selected from a group comprising of text, image, video, audio, multimedia and combinations thereof, and wherein the raw event data is selected from a group comprising of traffic jams, robbery, flood, climate updates, traffic accident, road blockage, criminal activity, mutually affecting event among multiple users and combinations thereof;
a context extractor module configured for extracting context from the electronic communication device and the monitoring module using a context mapping database storing the user specific contextual information;
a knowledge converter module configured to convert the raw event data and the raw context data into a structured knowledge format;
loading a combined structured knowledge comprising the refined structured background knowledge, the structured raw event data and the structured raw context data into a stream reasoning module;
applying stream reasoning by querying the combined structured knowledge to determine if the sensed raw event feed is relevant to the profile data and the user-specific contextual information for the user;
an application program module configured for processing alerts output from the stream reasoning module, transmitting the alerts to the electronic communication device and registering rules and queries received through the user interface unit to obtain the relevant alerts; and
the stream reasoning module in response to the queries and rules registered adapted to stream reasoned the refined structured background knowledge, the structured raw event data and the structured raw context data to determine if the raw event feed is relevant to the profile data and the user-specific contextual information of the user and accordingly transmit the notification alert to the user interface unit through the application program module if the raw event feed is determined as relevant.

14. The system of claim 13, wherein the stream reasoning module further comprises a memory unit for storing the structured knowledge in at least one format selected from a group comprising of a Triple, n-triple, Resource Description Framework (RDF), Web Ontology Language (OWL) or combinations thereof.

15. The system of claim 13, wherein the application program module further comprises:
a profile updater configured for updating the profile data including the user-specific contextual information and the demographic profile mined through the profile database;
a query listener adapted to monitor query results coming from the stream reasoning module;
an alert processor adapted to transmit the notification alert generated based on processing of results of query execution and an alert translator configured for translating the generated notification alert in to user-specified format before transmitting the alert to the electronic communication device.

16. The system of claim 13, wherein the raw event data and the raw context data are converted into the structured knowledge format using keyword pattern matching, information extraction techniques, Natural-Language Processing (NLP) algorithms and combinations thereof, and wherein the structured knowledge format is one of a Triple, n-triple, Resource Description Framework (RDF), Web Ontology Language (OWL) and combinations thereof.

* * * * *